(12) United States Patent
Wu et al.

(10) Patent No.: US 11,272,154 B2
(45) Date of Patent: Mar. 8, 2022

(54) PROVIDING VIDEO PLAYBACK AND DATA ASSOCIATED WITH A VIRTUAL SCENE

(71) Applicant: Youku Information Technology (Beijing) Co., Ltd., Beijing (CN)

(72) Inventors: Yuxing Wu, Hangzhou (CN); Xiaojie Sheng, Hangzhou (CN); Wuping Du, Hangzhou (CN); Wei Li, Hangzhou (CN); Ji Wang, Hangzhou (CN)

(73) Assignee: YOUKU INFORMATION TECHNOLOGY (BEIJING) CO., LTD., Beijing (CN)

( * ) Notice: Subject to any disclaimer, the term of this patent is extended or adjusted under 35 U.S.C. 154(b) by 49 days.

(21) Appl. No.: 16/611,312

(22) PCT Filed: Jan. 5, 2018

(86) PCT No.: PCT/CN2018/071556
§ 371 (c)(1),
(2) Date: Nov. 6, 2019

(87) PCT Pub. No.: WO2018/205663
PCT Pub. Date: Nov. 15, 2018

(65) Prior Publication Data
US 2020/0169711 A1 May 28, 2020

(30) Foreign Application Priority Data

May 9, 2017 (CN) .......................... 201710321559.8

(51) Int. Cl.
*H04N 13/117* (2018.01)
*H04N 13/194* (2018.01)
(Continued)

(52) U.S. Cl.
CPC ......... *H04N 13/117* (2018.05); *G06T 19/003* (2013.01); *H04N 5/23238* (2013.01); *H04N 13/194* (2018.05)

(58) Field of Classification Search
None
See application file for complete search history.

(56) References Cited

U.S. PATENT DOCUMENTS

| 5,828,410 A | 10/1998 | Drapeau |
| 6,504,990 B1 | 1/2003 | Abecassis |

(Continued)

FOREIGN PATENT DOCUMENTS

| CN | 101055494 A | 10/2007 |
| CN | 105704478 A | 6/2016 |

(Continued)

OTHER PUBLICATIONS

International Search Report to corresponding International Application No. PCT/CN2018/071556 dated Mar. 27, 2018 (2 pages).

*Primary Examiner* — Jason A Pringle-Parker
(74) *Attorney, Agent, or Firm* — James J. DeCarlo; Greenberg Traurig LLP

(57) ABSTRACT

Disclosed are video playback and data providing methods in a virtual scene, and a client and server implementing the same. The video playback method comprises: receiving current video segment data sent from a server, wherein the current video segment data represents a video segment, and the current video segment data comprises at least one specified viewing angle and a data identifier representing video segment data to which the specified viewing angle is directed; playing the video segment represented by the current video segment data, and acquiring a current viewing angle of a user during playback; and determining a target specified viewing angle matching the current viewing angle from the at least one specified viewing angle, wherein a (Continued)

video segment represented by video segment data to which the target specified viewing angle is directed is played at the end of the playback of the video segment represented by the current video segment data. The technical solution provided in the disclosure enables a user to move in a virtual scene while avoiding the use of external devices.

18 Claims, 9 Drawing Sheets

(51) Int. Cl.
  *G06T 19/00* (2011.01)
  *H04N 5/232* (2006.01)

(56) References Cited

U.S. PATENT DOCUMENTS

| | | |
|---|---|---|
| 6,741,250 B1 | 5/2004 | Furlan et al. |
| 7,430,360 B2 | 9/2008 | Abecassis |
| 8,274,564 B2 | 9/2012 | Girgensohn et al. |
| 9,342,911 B1* | 5/2016 | Sheridan .............. G06Q 10/101 |
| 9,554,160 B2 | 1/2017 | Han et al. |
| 9,602,795 B1 | 3/2017 | Matias et al. |
| 9,658,744 B1* | 5/2017 | Donsbach ............. G06F 3/0482 |
| 9,973,746 B2 | 5/2018 | Matias et al. |
| 10,650,590 B1* | 5/2020 | Topiwala ................ G06F 3/011 |
| 2013/0195204 A1 | 8/2013 | Reznik et al. |
| 2013/0201340 A1 | 8/2013 | Meadow et al. |
| 2014/0005484 A1 | 1/2014 | Charles |
| 2014/0079225 A1* | 3/2014 | Jarske .................... G06F 3/167 |
| | | 381/56 |
| 2015/0181258 A1 | 6/2015 | Kim et al. |
| 2016/0292884 A1 | 10/2016 | Schnittman et al. |
| 2017/0061687 A1 | 3/2017 | Hong et al. |
| 2017/0180800 A1* | 6/2017 | Mayrand .......... H04N 21/25858 |
| 2019/0026944 A1* | 1/2019 | Laaksonen .............. G06T 17/05 |

FOREIGN PATENT DOCUMENTS

| | | |
|---|---|---|
| CN | 106447788 A | 2/2017 |
| CN | 106502427 A | 3/2017 |

* cited by examiner

PROVIDING VIDEO PLAYBACK AND DATA ASSOCIATED WITH A VIRTUAL SCENE

This application is a national stage entry of Int'l Appl. No. PCT/CN2018/071556 filed on Jan. 5, 2018 and entitled "VIDEO PLAYBACK AND DATA PROVIDING METHOD IN VIRTUAL SCENE, CLIENT AND SERVER" which claims priority to Chinese Patent Application No. 201710321559.8, filed on May 9, 2017 and entitled "VIDEO PLAYBACK AND DATA PROVIDING METHOD IN VIRTUAL SCENE, CLIENT, AND SERVER," both of which are incorporated herein by reference in their entirety.

BACKGROUND

Technical Field

The disclosure relates to the field of Internet technologies, and in particular, to video playback and data providing methods and devices for providing a virtual scene.

Description of the Related Art

With the continuous development of virtual reality ("VR") technology, immersive video experiences have gained increased attention. Currently, to create an immersive video experience, information of a real scene (e.g., three-dimensional coordinates, reflectivity, and texture of a large number of dense dots on the surface of measured objects) can usually be captured using a three-dimensional laser scanning method based on the principle of laser ranging. In this way, a virtual scene consistent with the real scene can be rendered via the information obtained by the scanning. Users can walk around and take a tour in the virtual scene to enjoy an immersive video experience. For example, virtual scenes can be created based on real-world scenes such as supermarkets and malls, so that users can take part in activities of shopping at supermarkets and malls in the virtual scenes without leaving the house.

Creating an immersive experience via this technique is, however, expensive and consumes significant computing resources. The three-dimensional laser scanning method usually requires an expensive three-dimensional laser scanner, and an excessive amount of information is obtained (and thus processed) when scanning.

Currently, as a means to reduce production costs, immersive video experiences can usually be created by using a spatially indexed cubic panoramic video. Specifically, a spatially indexed cubic panoramic video can be input to a processing system, and panoramic video data can be compressed using a compression method supported by a three-dimensional graphics card to increase drawing speed. This technique reduces the amount of data required when building a virtual scene and increases the speed of rendering the virtual scene. Users can then easily and flexibly interact with the system using external devices (e.g., a gamepad, a mouse, a keyboard, etc.) and have an immersive experience in the virtual scene created by the system.

However, when using a spatially indexed cubic panoramic video in the manner described, when users move in a virtual scene, external devices are required to control the operations such as going forward or backward or turning. This method of interaction is not user-friendly and does not render a truly immersive experience.

SUMMARY

The disclosed embodiments provide video playback and data of a virtual scene that enable a user to move in a virtual scene while avoiding the use of external devices, thereby achieving a truly immersive experience.

To achieve the aforementioned objectives, the disclosed embodiments provide a video playback method in a virtual scene, wherein the method comprises: receiving current video segment data sent from a server, wherein the current video segment data represents a video segment, and the current video segment data comprises at least one specified viewing angle and a data identifier representing video segment data to which the specified viewing angle is directed; playing the video segment represented by the current video segment data, and acquiring a current viewing angle of a user during playback; and determining a target specified viewing angle matching the current viewing angle from the at least one specified viewing angle, wherein a video segment represented by video segment data to which the target specified viewing angle is directed is played at the end of the playback of the video segment represented by the current video segment data.

To achieve the aforementioned objectives, the disclosed embodiments further provide a client, wherein the client comprises a network communication port, a display, and a processor, wherein the network communication port is configured to receive current video segment data sent from a server; the display is configured to play a video segment; and the processor is configured to receive, via the network communication port, the current video segment data sent from the server, wherein the current video segment data represents a video segment, and the current video segment data comprises at least one specified viewing angle and a data identifier representing video segment data to which the specified viewing angle is directed; play, via the display, the video segment represented by the current video segment data, and acquire a current viewing angle of a user during playback; and determine a target specified viewing angle matching the current viewing angle from the at least one specified viewing angle, wherein a video segment represented by video segment data to which the target specified viewing angle is directed is played at the end of the playback of the video segment represented by the current video segment data.

To achieve the aforementioned objectives, the disclosed embodiments further provide a data providing method in a virtual scene, wherein a video segment data set is provided, the video segment data set comprises at least one piece of video segment data, and the video segment data represents a video segment, wherein each piece of video segment data comprises at least one specified viewing angle and a data identifier representing video segment data to which the specified viewing angle is directed, the method comprising: receiving a video segment data loading request sent from a client, wherein the video segment data loading request is used for representing a current position of a user in the virtual scene; feeding back to the client current video segment data corresponding to the current position of the user, so that the client plays a video segment represented by the current video segment data, and acquires a current viewing angle of the user during playback; and receiving a data identifier of target video segment data sent from the client, wherein a target specified viewing angle directed to the target video segment data matches the current viewing angle.

To achieve the aforementioned objectives, the disclosed embodiments further provide a server, wherein the server comprises a network communication port, a memory, and a processor, wherein the network communication port is configured to perform network data communication with a client; the memory is configured to store a video segment data set, wherein the video segment data set comprises at least one piece of video segment data, and the video segment data represents a video segment, wherein each piece of video segment data comprises at least one specified viewing angle and a data identifier representing video segment data to which the specified viewing angle is directed; and the processor is configured to receive, via the network communication port, a video segment data loading request sent from the client, wherein the video segment data loading request is used for representing a current position of a user in a virtual scene; control the network communication port to feed back to the client current video segment data corresponding to the current position of the user, so that the client plays a video segment represented by the current video segment data, and acquires a current viewing angle of the user during playback; and receive, via the network communication port, a data identifier of target video segment data sent from the client, wherein a target specified viewing angle directed to the target video segment data matches the current viewing angle.

To achieve the aforementioned objectives, the disclosed embodiments further provide a video playback method in a virtual scene, wherein a video segment data set is provided, the video segment data set comprises at least one piece of video segment data, and the video segment data represents a video segment, wherein each piece of video segment data comprises at least one specified viewing angle and a data identifier representing video segment data to which the specified viewing angle is directed, the method comprising: determining, from the video segment data set, current video segment data corresponding to a current position of a user in the virtual scene; playing a video segment represented by the current video segment data, and acquiring a current viewing angle of the user during playback; and determining a target specified viewing angle matching the current viewing angle from at least one specified viewing angle of the current video segment data, wherein a video segment represented by video segment data to which the target specified viewing angle is directed is played at the end of the playback of the video segment represented by the current video segment data.

To achieve the aforementioned objectives, the disclosed embodiments further provide a client, wherein the client comprises a memory, a display, and a processor, wherein the memory is configured to store a video segment data set, wherein the video segment data set comprises at least one piece of video segment data, and the video segment data represents a video segment, wherein each piece of video segment data comprises at least one specified viewing angle and a data identifier representing video segment data to which the specified viewing angle is directed; the display is configured to display a video segment; and the processor is configured to determine, from the video segment data set of the memory, current video segment data corresponding to a current position of a user in a virtual scene; play, via the display, a video segment represented by the current video segment data, and acquire a current viewing angle of the user during playback; and determine a target specified viewing angle matching the current viewing angle from at least one specified viewing angle of the current video segment data, wherein a video segment represented by video segment data to which the target specified viewing angle is directed is played at the end of the playback of the video segment represented by the current video segment data.

In view of the above, the disclosed embodiments can continuously play video segments to a user, enabling the user to browse objects in a virtual scene. Specifically, when a current video segment is played to the user, a current viewing angle of the user can be determined and a next video segment to be played can be determined according to the current viewing angle of the user. In this way, when playback of the current video segment is completed, the next video segment can be played. The video content presented in front of the user may also change as the viewing angle of the user changes. In this way, the user can perform operations such as going forward or backward or halting via the viewing angle, so that the use of external devices can be avoided to achieve a truly immersive experience.

BRIEF DESCRIPTION OF THE DRAWINGS

To describe the technical solutions in the disclosed embodiments, the accompanying drawings used in the description of the embodiments will be briefly introduced below. The accompanying drawings in the following description illustrate merely some of the embodiments. A person of ordinary skill in the art can also obtain other drawings based on the accompanying drawings without undue effort.

DETAILED DESCRIPTION

To enable a person skilled in the art to better understand the technical solutions in the disclosure, the technical solutions of the disclosed embodiments will be clearly and completely described below with reference to the accompanying drawings. The described embodiments are merely some rather than all of the embodiments. Based on the disclosed embodiments, all other embodiments obtained by a person of ordinary skill in the art without creative efforts shall fall within the scope of the disclosure.

Disclosed embodiments provide a video playback method and a data providing method in a virtual scene. The video playback method can be applied to a client, and the data providing method can be applied to a server. The server may be a device that stores panoramic video data. Specifically, the server may be a background operation server of a website capable of providing video services. Examples of current websites include, but are not limited to iQIYI, Sohu Video, or Acfun. In one embodiment, the server may be an electronic device having data computation and storage functions as well as a network interaction function. Alternatively, or in conjunction with the foregoing, the server may comprise software that runs on the electronic device and provides support for data processing and storage and network interaction. The number of the servers is not specifically limited in the disclosure. One or a plurality of servers may exist, or a server cluster may be formed by a plurality of servers.

In one embodiment, the client may be an electronic device for rendering panoramic video data and capable of capturing a viewing angle of a user. The client may be, for example, a desktop computer, a tablet computer, a notebook computer, a smartphone, a digital assistant, a smart wearable device, a shopping guide terminal, a television, or the like that has the function of capturing a viewing angle of a user. Alternatively, or in conjunction with the foregoing, the client may also be software capable of running on the aforementioned electronic device. Specifically, the client may be a web browser on the electronic device into which an access portal provided by a video website platform can be loaded. The video website platform may be, for example, iQIYI, Sohu Video, or Acfun, and the access portal may be a home page of the aforementioned website platform. The client may also be an application that is provided by the video website platform and runs on an intelligent terminal.

Figure 1:
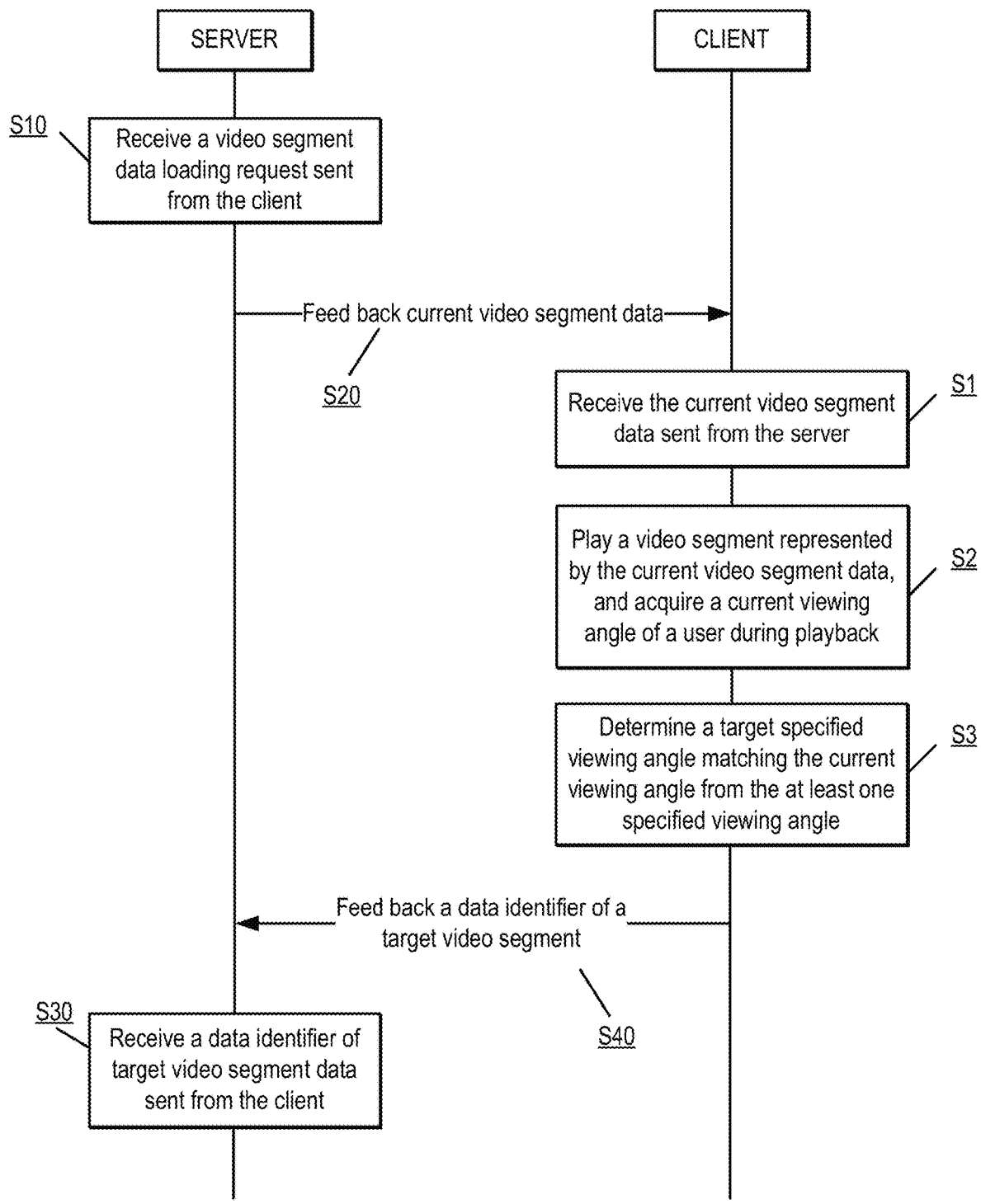
FIG. 1 is an interaction diagram illustrating interactions between a server and a client according to some embodiments of the disclosure.

FIG. 1 is an interaction diagram illustrating interactions between a server and a client according to some embodiments of the disclosure.

Step S1: receive current video segment data sent from a server, where the current video segment data represents a video segment, and the current video segment data includes at least one specified viewing angle and a data identifier representing video segment data to which the specified viewing angle is directed.

In one embodiment, a panoramic video of a real-world scene may be taken in advance, and then a virtual scene corresponding to the real-world scene may be built based on the panoramic video. In one embodiment, the real-world scene usually includes at least one path for people to walk on, where people can see the sights along the path when walking on the path. In one embodiment, a panoramic video may be taken on each path in the real-world scene. For example, referring to FIG. 2, a real-world scene may include eight paths (1-8), and a panoramic video corresponding to each of the eight paths (1-8) may be separately taken in practical application. Specifically, since one path may usually include two walking directions, people see the sights in different orders when walking in different directions along the path. Based on this, in this embodiment, panoramic videos of two directions may be separately taken for each path. In this way, each path can correspond to two videos. For example, on the path labeled 8 shown in FIG. 2 a panoramic video with a walking direction from left to right may be taken, and a panoramic video with a walking direction from right to left may further be taken. In this way, the path numbered 8 can correspond to two panoramic videos.

Figure 3:
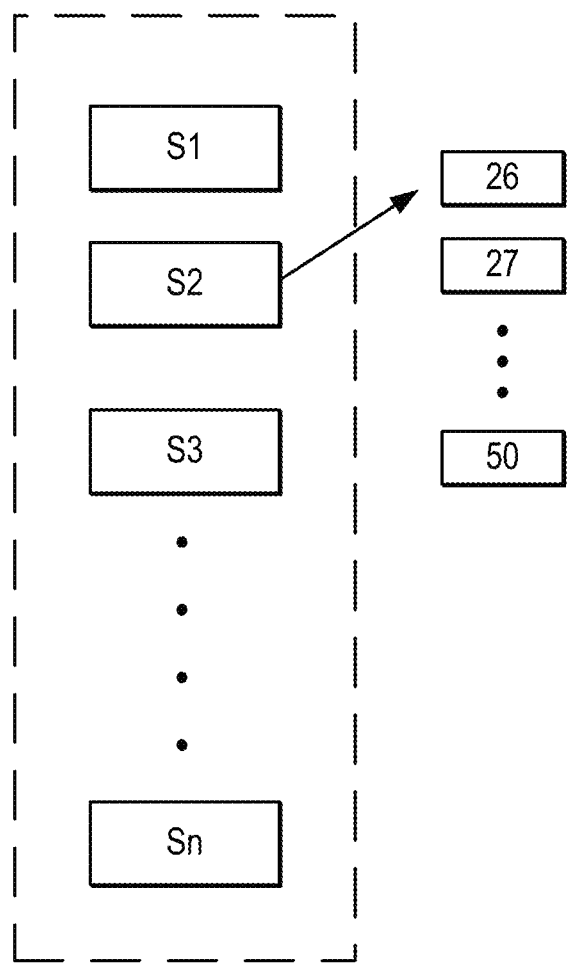
FIG. 3 is a diagram of video segments according to some embodiments of the disclosure.

In one embodiment, after a panoramic video corresponding to each path is taken, each video may be divided into at least one video segment at a specified time interval. For example, a panoramic video on a path may be 25 seconds in total with 25 frames per second. In this example, the panoramic video may be divided into 25 video segments at a time interval of one second, each video segment including 25 frames. For example, referring to FIG. 3, a panoramic video may be divided into n video segments in total (S1, S2, S3 . . . Sn), where each video segment (S1, S2, S3 . . . Sn) may include 25 frames. In this way, the video segment numbered S2 may include frame 26 to frame 50.

In one embodiment, after each panoramic video is divided into a plurality of video segments, at least one specified viewing angle may be configured for each video segment. Specifically, the specified viewing angle may be a combination of azimuth and pitch angles. In one embodiment, the specified viewing angle may represent a traveling direction in a virtual scene. For example, the specified viewing angle (0, 0) may represent a traveling direction right in front; ($\pi$, 0) may represent a traveling direction right in rear; ($\pi/4$, 0) may represent a traveling direction in the front left. For example, referring to FIG. 2, on the path numbered 8, the specified viewing angle (0, 0) may represent a traveling direction from left to right; the specified viewing angle ($\pi$, 0) may represent a traveling direction from right to left; when traveling to an intersection between the path numbered 8 and the path numbered 5, the specified viewing angle ($-3\pi/8$, 0) may represent a traveling direction of turning to the path numbered 5.

In one embodiment, the specified viewing angle corresponding to each video segment may be determined according to the position of the content shown in the video segment on the path. For example, for path 8 in FIG. 2, if the content shown in the video segment is the starting point of path 8, then the video segment may usually correspond to only one specified viewing angle representing walking forward. If the content shown in the video segment is the middle of path 8, then the video segment may usually correspond to two specified viewing angles of walking forward and walking backward. If the content shown in the video segment is the end of path 8, and the end intersects with each of path 5, path 6, and path 7, then the video segment may usually correspond to a plurality of specified viewing angles, which are respectively a specified viewing angle of turning to path 5, a specified viewing angle of walking to path 6, a specified viewing angle of turning to path 7, and a specified viewing angle of walking backward.

In one embodiment, each specified viewing angle configured for a video segment may be separately directed to another video segment. A specified viewing angle being directed to a video segment may represent that after playback of a current video segment is completed, a next video segment to be played can be determined according to a specified viewing angle configured for the current video segment.

In one embodiment, each video segment is usually stored on the server in the form of data, so that the server can have a video segment data set. The video segment data set may be stored on the server as a certain data type. The data type may be, for example, data types stored by databases including, but not limited to, MySQL, Oracle, DB2, and Sybase. The video segment data set may include various pieces of video segment data, where each piece of video segment data may represent a corresponding video segment. The video segment data representing a video segment may mean that the corresponding video segment can be obtained by performing rendering according to the video segment data. In one embodiment, the specified angle configured for each video segment may also be included in the video segment data. In this way, each piece of video segment data can include at least one specified angle.

In one embodiment, various pieces of video segment data stored on the server may have data identifiers. The data identifiers and the corresponding video segment data may be stored in the form of key-value pairs. The data identifiers may be keys, and the corresponding video segment data may be values. In this way, corresponding video segment data can be found via data identifiers. Based on this, the video segment data not only includes at least one specified viewing angle, but also may include a data identifier representing video segment data to which the specified viewing angle is directed. For example, a piece of video segment data includes two specified viewing angles (0, 0) and (π, 0), where a data identifier of video segment data to which the specified viewing angle (0, 0) is directed may be S2; a data identifier of video segment data to which the specified viewing angle (π, 0) is directed may be S10.

In one embodiment, a specified viewing angle and a corresponding data identifier thereof may be written in a fixed format in the video segment data. For example, the specified viewing angle and the corresponding data identifier thereof may be written into a specified field of the video segment data. The order of writing a specified viewing angle and a data identifier may be predefined in the specified field. For example, for a pair of corresponding specified viewing angle and data identifier, the specified viewing angle may be written ahead of the data identifier in the specified field. In this way, when the server or a client reads video segment data, for the content in the specified field, a specified viewing angle and a data identifier may be read in turn, and the continuously read specified viewing angle and data identifier are used as a pair of corresponding specified viewing angle and data identifier. For example, video segment data may include two specified viewing angles (0, 0) and (π, 0), where a data identifier of video segment data corresponding to (0, 0) may be S2, and a data identifier of video segment data corresponding to (π, 0) may be S10. Then, such a string as "(0, 0), S2, (π, 0), S10" may be written in a specified field of the video segment data. Certainly, in a practical application scenario, a specified viewing angle and a data identifier may both be written in binary form according to the format of video segment data. The aforementioned string is merely an example given for the ease of description, and does not constitute any limitation to the implementation of the technical solution of the disclosure. When the server or the client reads the video segment data, the content in the aforementioned string may be read in turn, so that the corresponding specified viewing angle and data identifier can be identified.

In one embodiment, various pieces of video segment data may be stored on the server. Specifically, video segment data in a plurality of scenes may be stored on the server, and the same scene identifier may be assigned to video segment data in the same scene to distinguish between different scenes.

In one embodiment, links representing various scenes may be displayed on the client. The links may be text links or image links. The links to the scenes may be bound to corresponding scene identifiers. When a user triggers a link to a scene, a video loading request including the scene identifier can be sent to the server.

In one embodiment, when receiving the video loading request, the server may extract the scene identifier therefrom and find, in a video segment database, video segment data corresponding to the scene identifier. In one embodiment, video segment data corresponding to a scene may have a piece of initial video segment data, and a video segment represented by the initial video segment data may be used as first video segment data played to the user. In this way, the server can feed back the initial video segment data to the server when receiving the video loading request. For example, when the user triggers a link to the scene shown in FIG. 2, the server may feed back to the client video segment data at the starting position of path 8, where the video segment data at the starting position of path 8 can be the initial video segment data corresponding to the scene. In this way, the visual experience of the user is that the user is at the starting position of path 8 when video playback starts.

In one embodiment, when the user triggers a link to a scene on the client, the server may further feed back to the client a plan view of the scene, and the plan view may be provided with at least one selectable position. For example, in the scene shown in FIG. 2, the starting positions of path 8 and path 5 are both selectable. In this way, the user may select a position in the plan view, and information of the position may be sent to the server. In this way, the server can feed back to the client video segment data corresponding to the position information, and the visual experience of the user is that the user is at the previously selected position when playback of the video segment starts.

In one embodiment, video segment data currently received by the client may be used as current video segment data. The current video segment data may represent a video segment. The current video segment data representing a video segment may mean that the video segment can be obtained by rendering the current video segment data. In one embodiment, according to the above description, the current video segment data may include at least one specified viewing angle and a data identifier representing video segment data to which the specified viewing angle is directed.

Step S2: play the video segment represented by the current video segment data, and acquire a current viewing angle of a user during playback.

In one embodiment, when receiving the current video segment data sent from the server, the client may render the current video segment data into the corresponding video segment by using a drawing standard such as Open GL or WebGL, and play the video segment obtained by rendering. Since the video segment obtained by rendering is taken in advance in a real-world scene, when the video segment is played, the visual experience of the user is that the user moves in the virtual scene in the direction in which the video segment is taken.

In one embodiment, when watching a panoramic video segment obtained by rendering, the user may change, by interacting with the client, the current viewing angle for playback by the client. As the viewing angle for playback by the client changes, the sight presented in front of the user may also be different. In this way, the current viewing angle for playback by the client may be used as the current viewing angle of the user. In one embodiment, without the aid of virtual reality (VR) glasses, the user can change, by swiping on a screen of the client, the current viewing angle for playback by the client. For example, when the user swipes to the right on the screen of the client with a finger, the current viewing angle for playback by the client can deflect to the left, which is equivalent to that the current viewing angle of the user deflects to the left, so that the sights on the left side of the path can be seen. In addition, with the aid of VR glasses, the user can change the current viewing angle by moving the head. When the user moves the head, the video content presented in front of the user also changes accordingly due to the effect of a gyroscope in the VR glasses. For example, when the user turns the head to the left, the current viewing angle for playback by the VR glasses can deflect to the left, so that the user can see the sights on the left side of the path.

Figure 2:
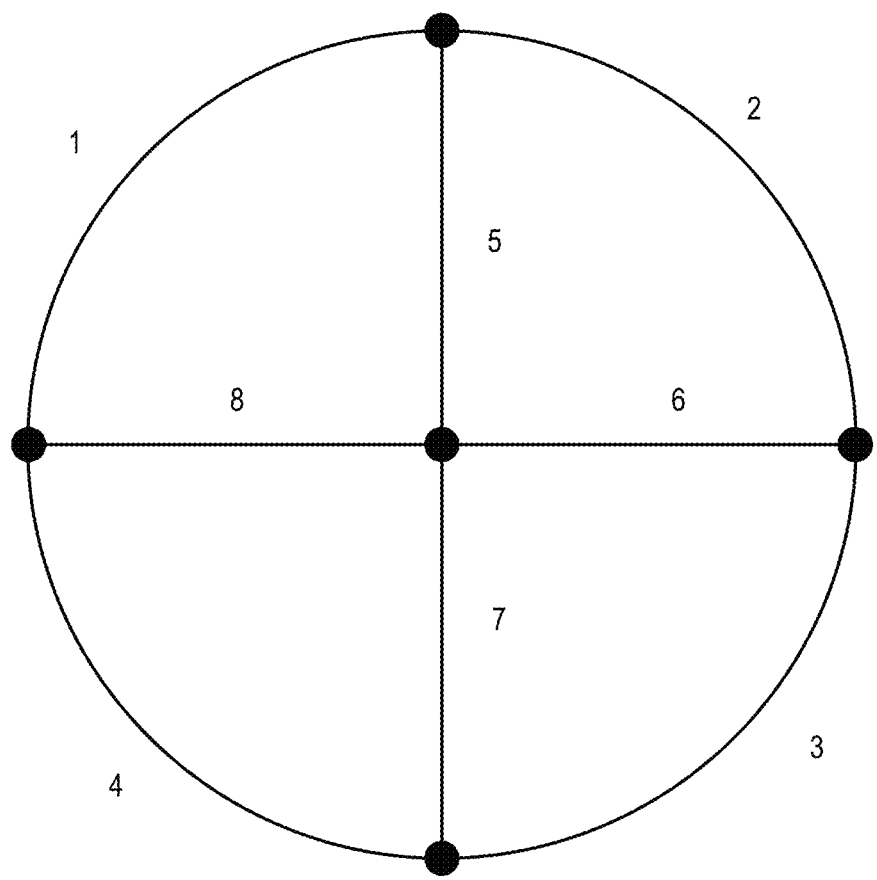
FIG. 2 is a diagram of a real-world scene according to some embodiments of the disclosure.

In one embodiment, in the process of playing the video segment represented by the current video segment data, a current viewing angle of the user may be acquired at a specified time point. The current viewing angle of the user may indicate the direction in which the user is currently watching. In one embodiment, a next video segment to be played may be decided according to the current watching direction of the user. Specifically, the client usually has an initial viewing angle for playback when showing a video segment to the user. For example, when a video segment at the starting position of path 8 in FIG. 2 is shown to the user, the initial viewing angle for playback may be a forward direction from left to right along path 8. Then, when the user interacts with the client to change the viewing angle for playback by the client, the angle between the changed viewing angle for playback and the initial viewing angle for playback may be used as the current viewing angle of the user. For example, the initial viewing angle for playback may be (0, 0), where the first 0 indicates that the azimuth angle is 0 degree, and the second 0 indicates that the pitch angle is 0 degree. Then, when the user swipes on the screen of the client or the user turns the head, the viewing angle for playback by the client may be changed, and the angle between the changed viewing angle for playback and the initial viewing angle for playback may be (20, 60), where 20 indicates that the angle between azimuth angles is 20 degrees, and 60 indicates that the angle between pitch angles is 60 degrees. In this way, (20, 60) can be used as the current viewing angle of the user. Certainly, in the aforementioned example, the current viewing angle is represented by azimuth and pitch angles. In practical application, the current viewing angle may further be represented by polar coordinates or the latitude and longitude, which is not limited in the disclosure.

In one embodiment, the time of acquiring the current viewing angle of the user may be the time when the playback of the video segment represented by the current video segment data is about to end. The time point at which the playback is about to end may be determined in a quantitative manner. Specifically, the time of acquiring the current viewing angle of the user may be determined according to the proportion of the number of remaining unplayed frames or played frames to the total number of frames in the video segment. For example, an instruction of acquiring the current viewing angle of the user may be triggered when the proportion of the number of remaining unplayed frames to the total number of frames decreases to 10%. For another example, the instruction of acquiring the current viewing angle of the user may be triggered when the proportion of the number of played frames to the total number of frames increases to 80%. Certainly, in practical application, the time of acquiring the current viewing angle of the user may further be determined according to the proportion of the time of the video segment played or the time of the video segment remaining unplayed to the total time.

Step S3: determine a target specified viewing angle matching the current viewing angle from the at least one specified viewing angle, where a video segment represented by video segment data to which the target specified viewing angle is directed is played at the end of the playback of the video segment represented by the current video segment data.

In one embodiment, after a current viewing angle of the user is determined, a target specified viewing angle matching the current viewing angle may be determined from the at least one specified viewing angle in the current video segment data. Specifically, the current viewing angle matching the target specified viewing angle may mean that the current viewing angle is the same as the target specified viewing angle or the angle between the current viewing angle and the target specified viewing angle is within a specified range. The specified range may be a predetermined angle value. For the azimuth and pitch angles, different angle values may be set, or the same angle value may be set. For example, the angle values corresponding to the azimuth and pitch angles may both be set to 45 degrees. Then, as long as angles between azimuth angles and pitch angles in the current viewing angle and a certain one of the at least one specified viewing angle are both within 45 degrees, the specified viewing angle can be used as the target specified viewing angle of the current viewing angle. For example, a specified viewing angle in the at least one specified viewing angle is (0, 0), and the current viewing angle is (30, −20). Then, since angles between the azimuth and pitch angles in the current viewing angle and the azimuth and pitch angles in the specified viewing angle are both within 45 degrees, (0, 0) can be used as the target specified viewing angle of (30, −20).

In one embodiment, after a target specified viewing angle is determined, a video segment represented by video segment data to which the target specified viewing angle is directed can be the next video segment to be played. Thus, the user can decide, by changing the current viewing angle, which video segment is to be played next. For example, the video segment currently played on the client shows the content at the end position on the rightmost side of path 8 in FIG. 2. When the playback of the video segment is about to end, the current viewing angle of the user acquired by the client is (3π/4, 0). That is, the current line of sight of the user deflects toward path 7. Video segment data corresponding to the currently played video segment includes four specified angles, which are respectively (0, 0), (π/2, 0), (−π/2, 0) and (π, 0). Each specified angle may correspond to an angle range of ±π/4. Then, it is found by calculating angles between the current viewing angle and the specified viewing angles that the angle between the current viewing angle and (π/2, 0) is within the angle range of π/4, and thus (π/2, 0) can be used as the target specified viewing angle of the current viewing angle. A video segment to which the target specified viewing angle (π/2, 0) is directed is a video segment at the starting position at the uppermost end of path 7. Then, the video segment at the initial position at the uppermost end of path 7 can be played after playback of the video segment at the end position of path 8 is completed. The visual effect of the user is that, when looking right at the end of the path, the user automatically turns to a rear path and moves on, thereby implementing the function of changing the position of the user in a virtual environment via the viewing angle of the user.

In view of the foregoing, a video segment represented by video segment data to which the target specified viewing angle is directed can be played when the playback of the video segment represented by the current video segment data ends, to produce a visual effect of position movement for the user, so that the complexity implementation is reduced (only the current viewing angle needs to be changed), and meanwhile, the use of external devices such as a gamepad, a mouse, and a keyboard can be avoided, thereby reducing costs and improving user experience.

In a specific application scenario, the user may browse sights in a virtual scene by wearing VR glasses. The VR glasses may have a network communication module to be communicatively connected to servers of various video websites. The user may visit the home page of a video website via VR glasses and select a panoramic video of interest on the home page via the line of sight. For example, the user currently selects the panoramic video of the scene shown in FIG. 2. In this case, the server of the video website may feed back to the VR glasses of the user video segment data at the starting position of path 8. In this way, when the VR glasses render the video segment data and play to the user a video segment obtained by rendering, the user is at the starting position of path 8 in the visual effect. When the playback of the video segment is about to end, the VR glasses may acquire the current viewing angle of the user, which is (0, 0), indicating that the user is currently watching the sight right in front. In this case, the VR glasses may read a data identifier of video segment data corresponding to a specified viewing angle of (0, 0) from a header data field in the video segment data representing the starting position, and may feed back the data identifier to the server of the video website. In this way, the server of the video website can feed back to the VR glasses the video segment data to which the data identifier is directed. After the playback of the current video segment ends, the VR glasses may continue to play a video segment represented by video segment data that is again acquired from the server of the video website. In this way, the visual experience of the user is that when the line of sight is fixed on the front of the path, the user can walk straight ahead in the virtual scene; when the user turns to look at the opposite direction of the path, the user can walk in the opposite direction of the path. In this way, the user can decide the walking direction in a virtual scene by changing the current viewing angle, so that the complexity of implementation is reduced, and meanwhile, the use of external devices such as a gamepad, a mouse, and a keyboard can be avoided, thereby reducing costs and improving user experience.

Figure 4:
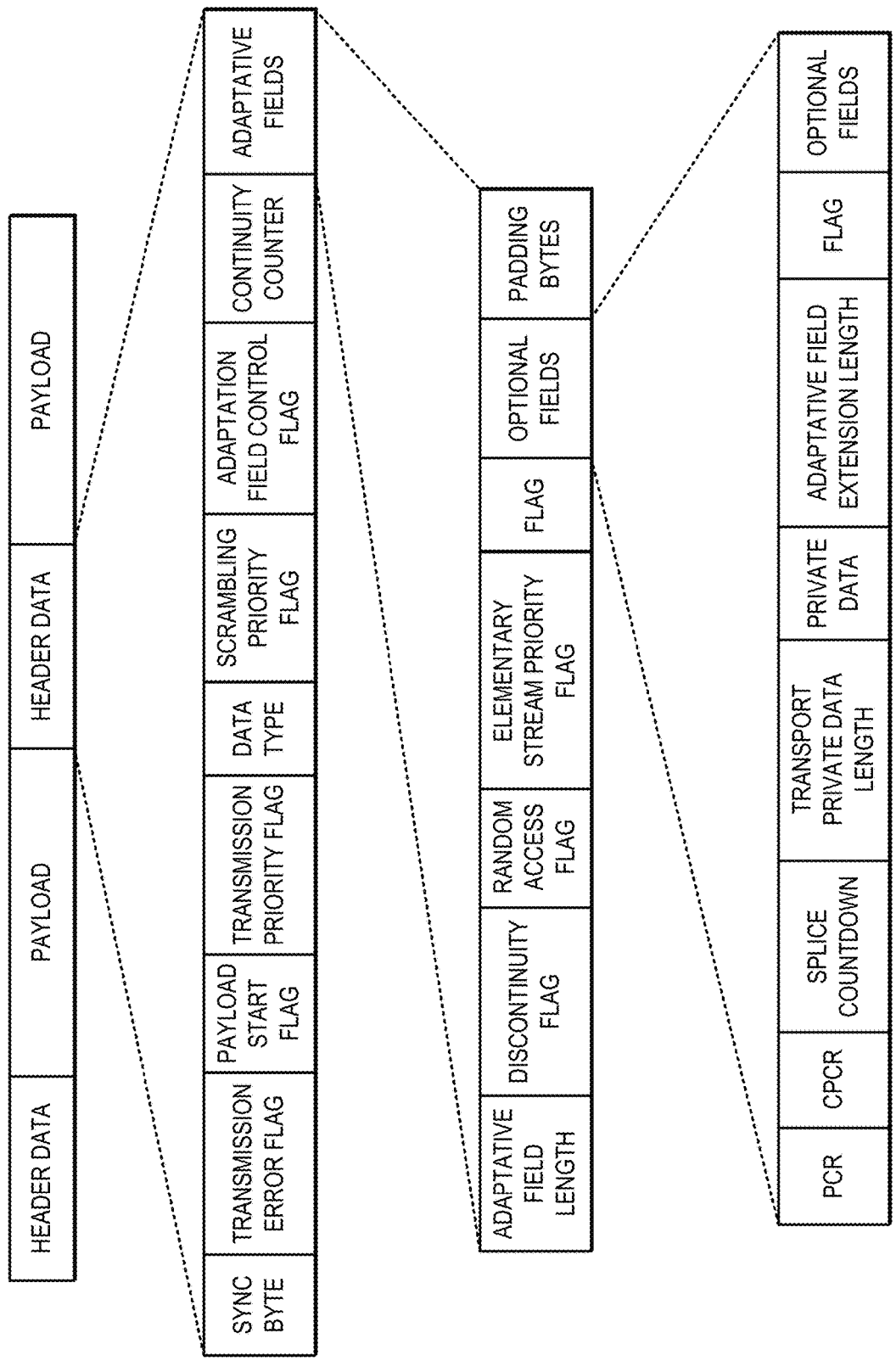
FIG. 4 is a diagram of data in a Transport Stream (TS) format according to some embodiments of the disclosure.

In one embodiment, the current video segment data may include a header data field and a body data field. The header data field may be filled with information required for transmitting the video segment data in the network. The constituent of the header data field is usually fixed. The data in the body data field may be rendered by the client, to obtain a video segment shown on the client. In one embodiment, the at least one specified viewing angle and the data identifier representing the video segment data to which the specified viewing angle is directed may be stored in the header data field. In this way, when receiving the current video segment data, the client can read the header data field of the data and acquire therefrom the specified viewing angle and data identifier that are included. For example, referring to FIG. 4, the current video segment data may be written in a Transport Stream (TS) format, and data in the TS format may include a header data field and a payload field. The payload field may be the aforementioned body data field, and the payload field may be filled with data for rendering to obtain a current video segment. The header data field may include a sync byte field, a transmission error flag field, a payload start flag field, a transmission priority flag field, a data type field, a scrambling priority flag field, an adaptation field control flag field, a continuity counter field, and an adaptive fields field. The aforementioned fields may be defined in the TS format. The adaptive fields field may further include a plurality of fields. Specifically, as shown in FIG. 4, the adaptive fields field may include an adaptive field length field, a discontinuity flag field, a random access flag field, an elementary stream priority flag field, a flag field, an optional fields field, and a padding bytes field. The aforementioned fields in the adaptive fields field may also be defined in the TS format. In one embodiment, the optional fields field may further include a Program Clock Reference (PCR) field, a Current Program Clock Reference (CPCR) field, a splice countdown field, a transport private data length field, a private data field, an adaptive field extension length field, a flag field, and an optional fields field. The aforementioned fields in the TS format may all be predefined in the TS format. In one embodiment, the at least one specified viewing angle and the data identifier representing the video segment data to which the specified viewing angle is directed may be stored in a private data field of the header data field. In the private data field, the specified viewing angle and the data identifier may be written according to requirements of the TS format. Specifically, the length of the private data field may be indicated by 8 bits, namely, a maximum of 255 bytes can be held. In one embodiment, each set of specified viewing angle and data identifier may be used as a unit structure, where each unit structure may occupy 12 bytes. Each unit structure may include a specified viewing angle represented by two floating-point types and a data identifier represented by an integer type. The two floating-point types are respectively used to represent an azimuth angle and a pitch angle in the specified viewing angle. For example, assume that the current video segment data includes two sets of specified viewing angles and data identifiers, where each set of specified viewing angle and data identifier may be represented by 12 bytes; then, the two sets of specified viewing angles and data identifiers may be represented by 24 bytes in the current video segment data. It should be noted that the aforementioned data in the TS format is merely an example given for describing the technical solution of one embodiment of the disclosure, and it is not indicated that this embodiment is applicable only to data in the TS format. In fact, as long as custom fields exist, a specified viewing angle and a data identifier can both be written via the custom fields in data in other formats.

In one embodiment, after a target specified viewing angle matching the current viewing angle is determined from the at least one specified viewing angle, the client may further send to the server a data identifier of video segment data to which the target specified viewing angle is directed, to acquire from the server the video segment data to which the target specified viewing angle is directed.

In one embodiment, data identifiers and video segment data may be stored in an associated manner on the server. Specifically, the data identifiers and the corresponding video segment data may be stored in the form of key-value pairs. The data identifiers may be keys, and the corresponding video segment data may be values. In this way, corresponding video segment data can be found via data identifiers. In this way, when receiving from the client the data identifier of the video segment data to which the target specified viewing angle is directed, the server can acquire the video segment data corresponding to the received data identifier from the video segment database, and feed back the video segment data to the client, so that after playing the current video segment, the client plays a video segment represented by the video segment data. The target specified viewing angle corresponds to the data identifier, and the data identifier may further be associated with the video segment data, so that the video segment data can be regarded as video segment data to which the target specified viewing angle is directed.

In one embodiment, to improve the fluency of video playback, when a current video segment is played, other video segments related to the current video segment may be preloaded into the client, so that a next video segment to be played can be directly invoked locally after playback of the current video segment is completed. Specifically, in this embodiment, after current video segment data sent from the server is received, video segment data, to which data identifiers of various pieces of video segment data included in the current video segment data are directed, may further be acquired from the server. For example, the current video segment data includes a total of four sets of specified viewing angles and data identifiers. Then, when receiving the current video segment data, the client may identify the four data identifiers included therein and send to the server a data acquisition request including the four data identifiers, so that video segment data to which the four data identifiers are directed can be preloaded locally from the server. In this way, after a target specified viewing angle matching the current viewing angle is determined from the at least one specified viewing angle, target video segment data to which the target specified viewing angle is directed can be determined from the acquired various pieces of video segment data, and a video segment represented by the target video segment data can be played at the end of the playback of the video segment represented by the current video segment data. The fluency of video playback can be improved by such a method of preloading video segment data.

In one embodiment, each path in the virtual scene may include a forward direction and a reverse direction. Based on this, each piece of video segment data on the server may further have direction information, and the direction information may be used for indicating whether the video segment is played in the forward direction of the path or in the reverse direction of the path. For example, direction information corresponding to a video segment having a playback order from left to right on path 8 in FIG. 2 is the forward direction, and direction information corresponding to a video segment having a playback order from right to left is the reverse direction. Consider that when the user moves in a virtual scene, the motion trajectory thereof usually has certain inertia. The inertia is reflected in that, if a current video segment played to the user is a forward video segment, then a next video segment to be played is most probably a forward video segment, too. Based on this, after current video segment data sent from the server is received, a data identifier of video segment data having direction information consistent with that of the current video segment data may be determined from various data identifiers included in the current video segment data, and the video segment data to which the determined data identifier is directed may be acquired from the server. In this way, after acquiring the current video segment data, the client can immediately acquire from the server video segment data having direction information consistent with that of the current video segment data. In this way, after playback of the current video segment is completed, the video segment having the consistent direction information and acquired from the server is probably played, thereby improving the fluency of video playback by preloading.

In one embodiment, each specified viewing angle in the video segment data may correspond to a viewing angle range. The viewing angle range may include the specified viewing angle. For example, a viewing angle range corresponding to the specified viewing angle (0, 0) may be ($-\pi/4$, 0) to ($\pi/4$, 0). In this way, in determining a target specified viewing angle matching the current viewing angle from the at least one specified viewing angle, a viewing angle range of the current viewing angle may be determined, and a specified viewing angle corresponding to the determined viewing angle range may be used as the target specified viewing angle. For example, the current viewing angle is ($\pi/8$, 0). Then the current viewing angle is within a viewing angle range of ($-\pi/4$, 0) to ($\pi/4$, 0), so that a specified viewing angle (0, 0) corresponding to the viewing angle range can be used as the target specified viewing angle of the current viewing angle.

In one embodiment, if the target specified viewing angle matching the current viewing angle does not exist in the at least one specified viewing angle, then it is indicated that a next video slice to be played cannot be determined according to the current viewing angle of the user, and then this case may correspond to the situation in which the user halts in the virtual scene. For example, the current viewing angle of the user is beyond the viewing angle ranges corresponding to the specified viewing angles, so that no target specified viewing angle corresponding to the current viewing angle exists. In this case, a frame in the video segment represented by the current video segment data may be displayed at the end of the playback of the video segment represented by the current video segment data, thereby achieving the effect of video pause. To keep the frames coherent, the paused frame is usually the last frame in the current video segment.

In one embodiment, to reduce the costs of taking a panoramic video, only a panoramic video in a specified direction may be taken for each path in a real-world scene, so that each path is associated with the panoramic video taken in the specified direction on the path. In one embodiment, the panoramic video in the specified direction may be used as a forward panoramic video, and a panoramic video opposite to the specified direction may be used as a reverse panoramic video. In one embodiment, the panoramic video may be divided into at least one video segment at a specified time interval. For example, a panoramic video on a path is 25 seconds in total with 25 frames per second; then, the panoramic video may be divided into 25 video segments at a time interval of 1 second, each video segment including 25 frames.

Figure 5:
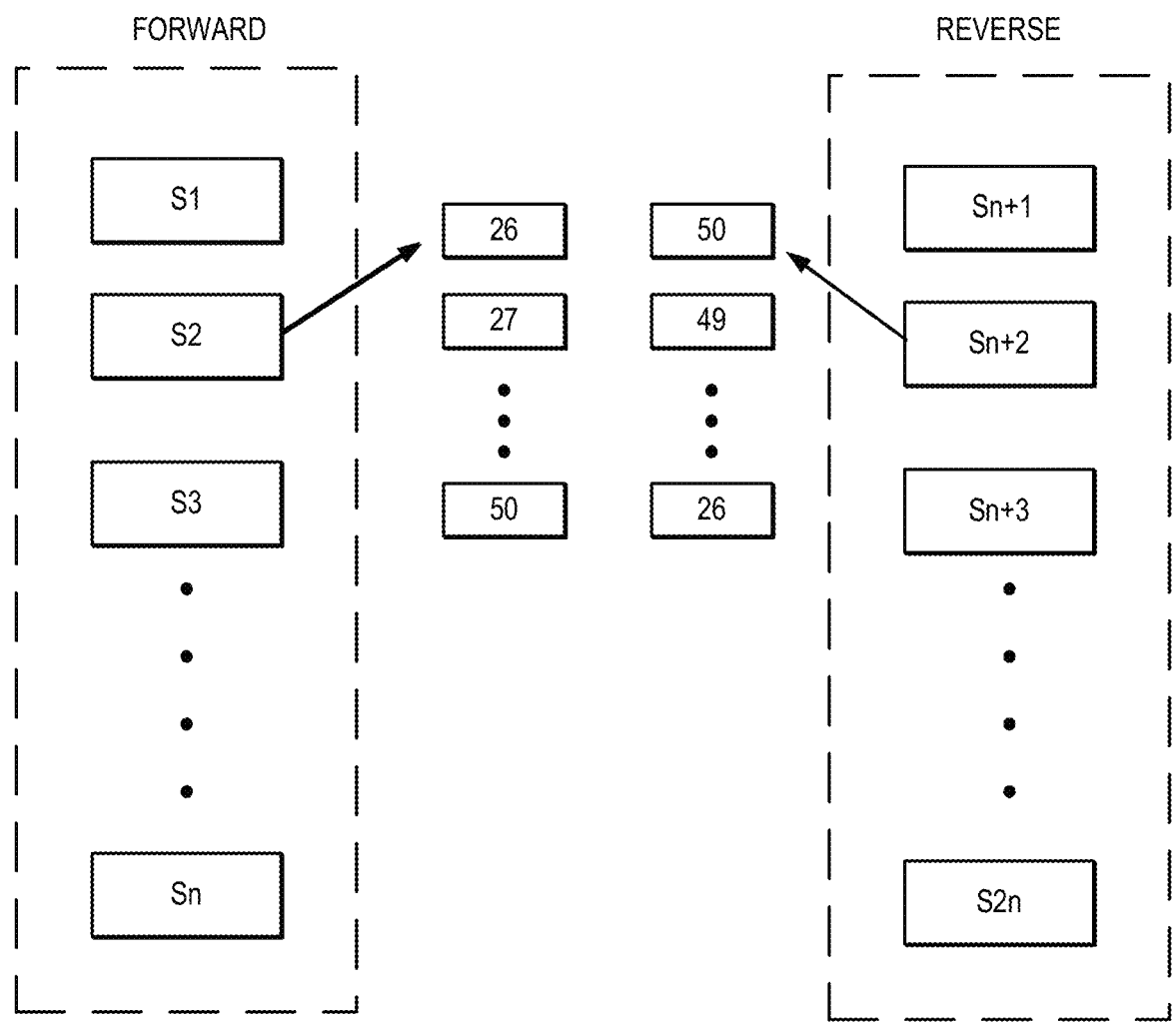
FIG. 5 is a diagram of forward and reverse video segments according to some embodiments of the disclosure.

In one embodiment, according to video segments obtained by dividing the panoramic video, reverse video segments respectively corresponding to the video segments may be generated, where a playback order of the reverse video segments is opposite to a playback order of the corresponding video segments. Specifically, since the panoramic video includes information of 360 degrees, the reverse panoramic video can be obtained when the forward panoramic video is played in an inverted order. Specifically, each video segment in the forward panoramic video is reversely played, to obtain each video segment in the reverse panoramic video. In this way, the reverse panoramic video and the forward panoramic video can include the same number of video segments, and the playback order of the video segments in the reverse panoramic video is opposite to the playback order of the corresponding video segments in the forward panoramic video. For example, referring to FIG. 5, Sn video segments obtained by dividing a forward panoramic video are shown on the left side, where each video segment may include 25 frames. In this way, the video segment numbered S2 may include frame 26 to frame 50. The playback of the video segment S2 can start from frame 26 and proceed to each frame in turn until frame 50. In generating a reverse panoramic video according to the forward panoramic video, each video segment in the forward panoramic video may be reversely played, to obtain each video segment in the reverse panoramic video. For example, for the video segment S2 in the forward panoramic video, frame 50 may be used as the first frame to be played, and frame 26 may be used as the last frame to be played. Then, a video segment Sn+1 in the reverse panoramic video can be obtained by playing the video segment in such an order.

Figure 6:
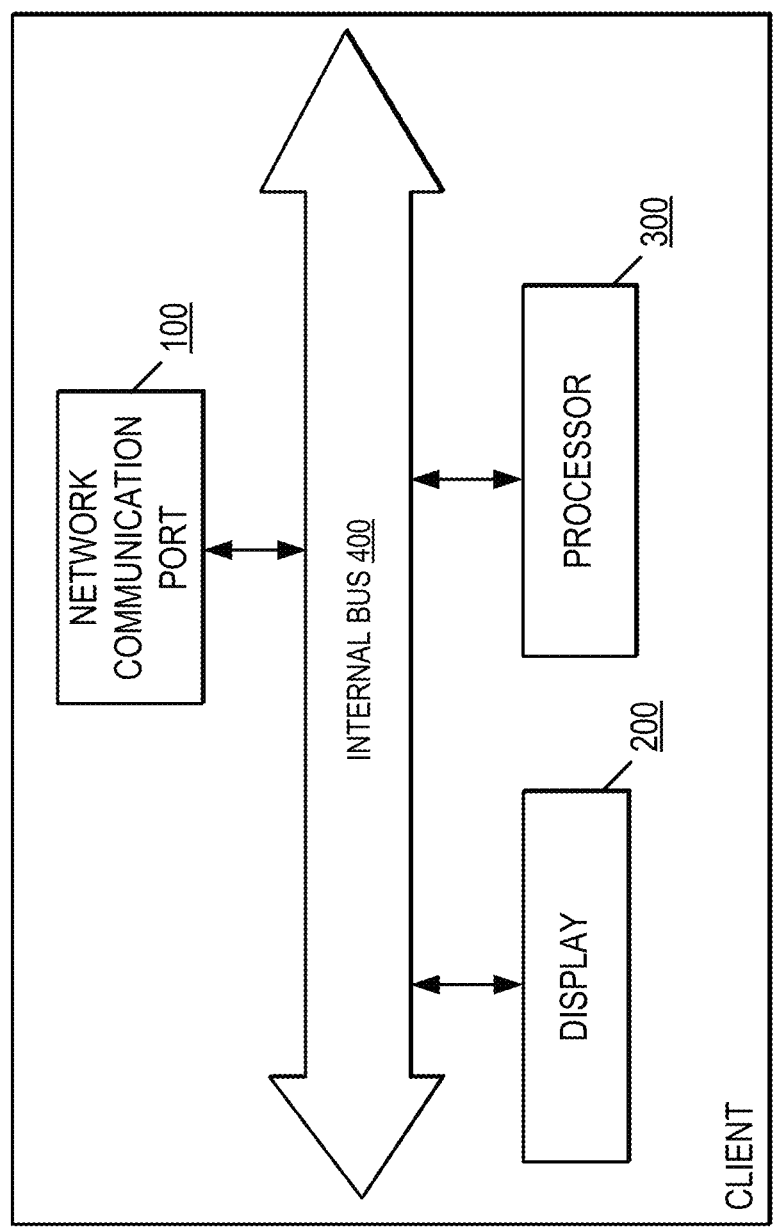
FIG. 6 is a block diagram of a client according to some embodiments of the disclosure.

Referring to FIG. 6, the disclosed embodiments further provide a client, including a network communication port 100, a display 200, a processor 300, and an internal communications bus 400.

The network communication port 100 is configured to receive current video segment data sent from a server.

The display 200 is configured to play a video segment.

The processor 300 is configured to receive, via the network communication port, the current video segment data sent from the server, where the current video segment data represents a video segment, and the current video segment data includes at least one specified viewing angle and a data identifier representing video segment data to which the specified viewing angle is directed; play, via the display, the video segment represented by the current video segment data, and acquire a current viewing angle of a user during playback; and determine a target specified viewing angle matching the current viewing angle from the at least one specified viewing angle, where a video segment represented by video segment data to which the target specified viewing angle is directed is played at the end of the playback of the video segment represented by the current video segment data.

In one embodiment, the network communication port 100 may be a virtual port, bound to different communication protocols, to send or receive different data. For example, the network communication port may be port 80 (responsible for web data communication), may be port 21 (responsible for FTP data communication), or may be port 25 (responsible for mail data communication). In addition, the network communication port may be a physical communication interface or communication chip. For example, the network communication port may be a wireless mobile network communication chip, for example, GSM or CDMA; the network communication port may further be a Wi-Fi (Wireless Fidelity) chip; the network communication port may further be a Bluetooth chip.

In one embodiment, the display 200 may be a display tool that displays a certain electronic file on a screen via a specific transmission device and then reflects the electronic file to human eyes. The display may include a liquid crystal (LCD) display screen, a cathode ray tube (CRT) display screen, a light-emitting diode (LED) display screen, or the like.

The processor 300 may be implemented in any appropriate manner. For example, the processor may employ the form of a microprocessor or processor and a computer-readable medium that stores computer-readable program code (for example, software or firmware) executable by the (micro) processor, a logic gate, a switch, an application specific integrated circuit (ASIC), a programmable logic controller, and an embedded microcontroller. The type of processor is not limited in the disclosure.

The specific functions implemented by the network communication port 100, the display 200, the processor 300, and the bus 400 of the client disclosed in the aforementioned embodiment may be explained with reference to the embodiment of the video playback method in a virtual scene in the disclosed embodiments, can implement the embodiment of the video playback method in a virtual scene in the disclosed embodiments, and achieve the technical effects of the method embodiment.

The disclosure further provides a data providing method in a virtual scene, and the method can be applied to a server. In one embodiment, the server may be provided with a video segment data set. The video segment data set includes at least one piece of video segment data, and the video segment data represents a video segment. Each piece of video segment data includes at least one specified viewing angle and a data identifier representing video segment data to which the specified viewing angle is directed. Referring to FIG. 1, the method may include the following steps.

Step S10: receive a video segment data loading request sent from a client, where the video segment data loading request is used for representing a current position of a user in the virtual scene.

Step S20: feed back to the client current video segment data corresponding to the current position of the user, so that the client plays a video segment represented by the current video segment data, and acquires a current viewing angle of the user during playback.

Step S30: receive a data identifier of target video segment data sent (S40) from the client, where a target specified viewing angle directed to the target video segment data matches the current viewing angle.

In one embodiment, links representing various scenes may be displayed on the client. The links may be text links or image links. The links to the scenes may be bound to corresponding scene identifiers. When a user triggers a link to a scene, a video loading request including the scene identifier can be sent to the server.

In one embodiment, when receiving the video loading request, the server may extract the scene identifier therefrom and find, in a video segment database, video segment data corresponding to the scene identifier. In one embodiment, video segment data corresponding to a scene may have a piece of initial video segment data, and a video segment represented by the initial video segment data may be used as first video segment data played to the user. In this way, the server can feed back the initial video segment data to the server when receiving the video loading request. For example, when the user triggers a link to the scene shown in FIG. 2, the server may feed back to the client video segment data at the starting position of path 8, where the video segment data at the starting position of path 8 can be the initial video segment data corresponding to the scene. In this way, the visual experience of the user is that the user is at the starting position of path 8 when video playback starts. Thus, the video segment data loading request sent by the client to the server can be used for representing a current position of the user in the virtual scene. In this scenario, the current position of the user in the virtual scene can be an initial position represented by the initial video segment data.

In one embodiment, when the user triggers a link to a scene on the client, the server may further feed back to the client a plan view of the scene, and the plan view may be provided with at least one selectable position. For example, in the scene shown in FIG. 2, the starting positions of path 8 and path 5 are both selectable. In this way, the user may select a position in the plan view, and information of the position can be sent as a video loading request to the server. In this way, the server can feed back to the client video segment data corresponding to the position information, and the visual experience of the user is that the user is at the previously selected position when playback of the video segment starts. Thus, in this scenario, the current position of the user in the virtual scene can be the position selected by the user.

In one embodiment, after acquiring current video segment data corresponding to the current position of the user, the server may feed back the current video segment data to the client. In one embodiment, when receiving the current video segment data sent from the server, the client may render the current video segment data into the corresponding video segment by using a drawing standard such as OpenGL or WebGL, and play the video segment obtained by rendering. Since the video segment obtained by rendering is taken in advance in a real-world scene, when the video segment is played, the visual experience of the user is that the user moves in the virtual scene in the direction in which the video segment is taken.

In one embodiment, when watching a panoramic video segment obtained by rendering, the user may change, by interacting with the client, the current viewing angle for playback by the client. As the viewing angle for playback by the client changes, the sight presented in front of the user may also be different. In this way, the current viewing angle for playback by the client may be used as the current viewing angle of the user. In one embodiment, without the aid of virtual reality (VR) glasses, the user can change, by swiping on a screen of the client, the current viewing angle for playback by the client. For example, when the user swipes to the right on the screen of the client with a finger, the current viewing angle for playback by the client can deflect to the left, which is equivalent to that the current viewing angle of the user deflects to the left, so that the sights on the left side of the path can be seen. In addition, with the aid of VR glasses, the user can change the current viewing angle by moving the head. When the user moves the head, the video content presented in front of the user also changes accordingly due to the effect of a gyroscope in the VR glasses. For example, when the user turns the head to the left, the current viewing angle for playback by the VR glasses can deflect to the left, so that the user can see the sights on the left side of the path.

In one embodiment, in the process of playing the video segment represented by the current video segment data, a current viewing angle of the user may be acquired at a specified time point. The current viewing angle of the user may indicate the direction in which the user is currently watching. In one embodiment, a next video segment to be played may be decided according to the current watching direction of the user. Specifically, the client usually has an initial viewing angle for playback when showing a video segment to the user. For example, when a video segment at the starting position of path 8 in FIG. 2 is shown to the user, the initial viewing angle for playback may be a forward direction from left to right along path 8. Then, when the user interacts with the client to change the viewing angle for playback by the client, the angle between the changed viewing angle for playback and the initial viewing angle for playback may be used as the current viewing angle of the user. For example, the initial viewing angle for playback may be (0, 0), where the first 0 indicates that the azimuth angle is 0 degree, and the second 0 indicates that the pitch angle is 0 degree. Then, when the user swipes on the screen of the client or the user turns the head, the viewing angle for playback by the client may be changed, and the angle between the changed viewing angle for playback and the initial viewing angle for playback may be (20, 60), where 20 indicates that the angle between azimuth angles is 20 degrees, and 60 indicates that the angle between pitch angles is 60 degrees. In this way, (20, 60) can be used as the current viewing angle of the user. Certainly, in the aforementioned example, the current viewing angle is represented by azimuth and pitch angles. In practical application, the current viewing angle may further be represented by polar coordinates or the latitude and longitude, which is not limited in the disclosure.

In one embodiment, after determining a current viewing angle of the user, the client may determine a target specified viewing angle matching the current viewing angle from the at least one specified viewing angle in the current video segment data. Specifically, the current viewing angle matching the target specified viewing angle may mean that the current viewing angle is the same as the target specified viewing angle or the angle between the current viewing angle and the target specified viewing angle is within a specified range.

In one embodiment, after determining a target specified viewing angle, the client may acquire, from the current video segment data, a data identifier of target video segment data to which the target specified viewing angle is directed. After acquiring the data identifier of the target video segment data, the client may send the data identifier to the server. In this way, the server can receive the data identifier of the target video segment data sent from the client. After acquiring the data identifier, the server may acquire video segment data corresponding to the data identifier from a video segment data set, and feed back the video segment data to the client, so that after playing the current video segment, the client continues to play a video segment represented by the video segment data and fed back by the server.

In one embodiment, each piece of video segment data in the video segment data set includes a header data field and a body data field, where the at least one specified viewing angle and the data identifier representing the video segment data to which the specified viewing angle is directed are stored in the header data field.

In one embodiment, each specified viewing angle corresponds to a viewing angle range; and accordingly, a target specified viewing angle directed to the target video segment data matching the current viewing angle includes: the current viewing angle being within a viewing angle range of the target specified viewing angle.

In one embodiment, the virtual scene includes at least one path, where each of the paths is associated with a panoramic video taken in a specified direction on the path, and the panoramic video is divided into at least one video segment at a specified time interval.

In one embodiment, the method further includes: generating, according to video segments obtained by dividing the panoramic video, reverse video segments respectively corresponding to the video segments, where a playback order of the reverse video segments is opposite to a playback order of the corresponding video segments.

The specific implementations of the aforementioned embodiments have been described in the embodiment of the video playback method in a virtual scene, and will not be described herein again.

Figure 7:
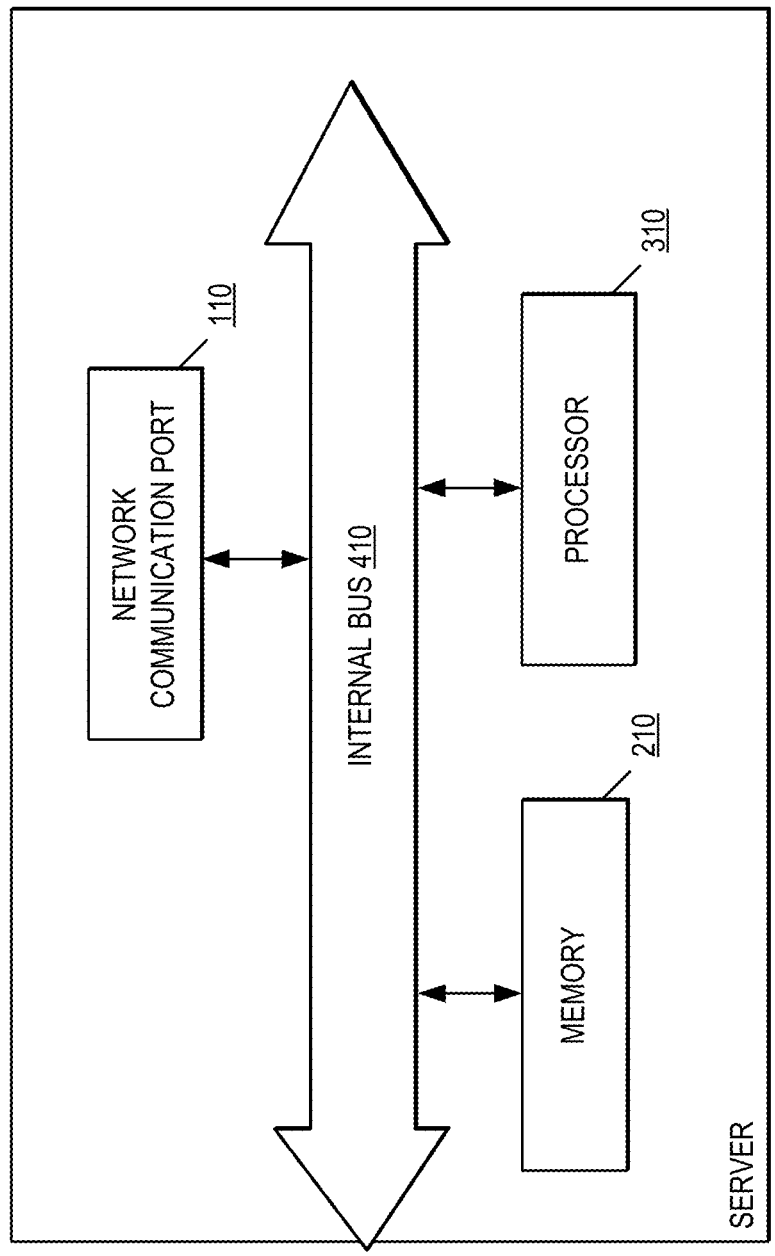
FIG. 7 is a block diagram of a server according to some embodiments of the disclosure.

Referring to FIG. 7, the disclosure further provides a server, including a network communication port 110, a memory 210, a processor 310, and an internal communications bus 410.

The network communication port 110 is configured to perform network data communication with a client.

The memory 210 is configured to store a video segment data set. The video segment data set includes at least one piece of video segment data, and the video segment data represents a video segment. Each piece of video segment data includes at least one specified viewing angle and a data identifier representing video segment data to which the specified viewing angle is directed.

The processor 310 is configured to receive, via the network communication port, a video segment data loading request sent from the client, where the video segment data loading request is used for representing a current position of a user in a virtual scene; control the network communication port to feed back to the client current video segment data corresponding to the current position of the user, so that the client plays a video segment represented by the current video segment data, and acquires a current viewing angle of the user during playback; and receive, via the network communication port, a data identifier of target video segment data sent from the client, where a target specified viewing angle directed to the target video segment data matches the current viewing angle.

In one embodiment, the network communication port 110 may be a virtual port bound to different communication protocols, to send or receive different data. For example, the network communication port may be port 80 (responsible for web data communication), may be port 21 (responsible for FTP data communication), or may be port 25 (responsible for mail data communication). In addition, the network communication port may be a physical communication interface or communication chip. For example, the network communication port may be a wireless mobile network communication chip, for example, GSM or CDMA; the network communication port may further be a Wi-Fi (Wireless Fidelity) chip; the network communication port may further be a Bluetooth chip.

In one embodiment, the memory 210 may be a memory device for storing information. In a digital system, a device capable of storing binary data may be a memory; in an integrated circuit, a circuit without a physical form and having a storage function may also be a memory such as a RAM or FIFO; in a system, a storage device in a physical form may also be referred to as a memory such as a memory bar or a TF card.

The processor 310 may be implemented in any appropriate manner. For example, the processor may employ the form of a microprocessor or processor and a computer-readable medium that stores computer-readable program code (for example, software or firmware) executable by the (micro)processor, a logic gate, a switch, an application specific integrated circuit (ASIC), a programmable logic controller, and an embedded microcontroller. The disclosure does not make limitation.

The specific functions implemented by the network communication port 110, the memory 210, the processor 310, and the bus 410 of the server disclosed in the aforementioned embodiment may be explained with reference to the embodiment of the data providing method in a virtual scene in the disclosure, can implement the embodiment of the data providing method in a virtual scene in the disclosure, and achieve the technical effects of the method embodiment.

Figure 8:
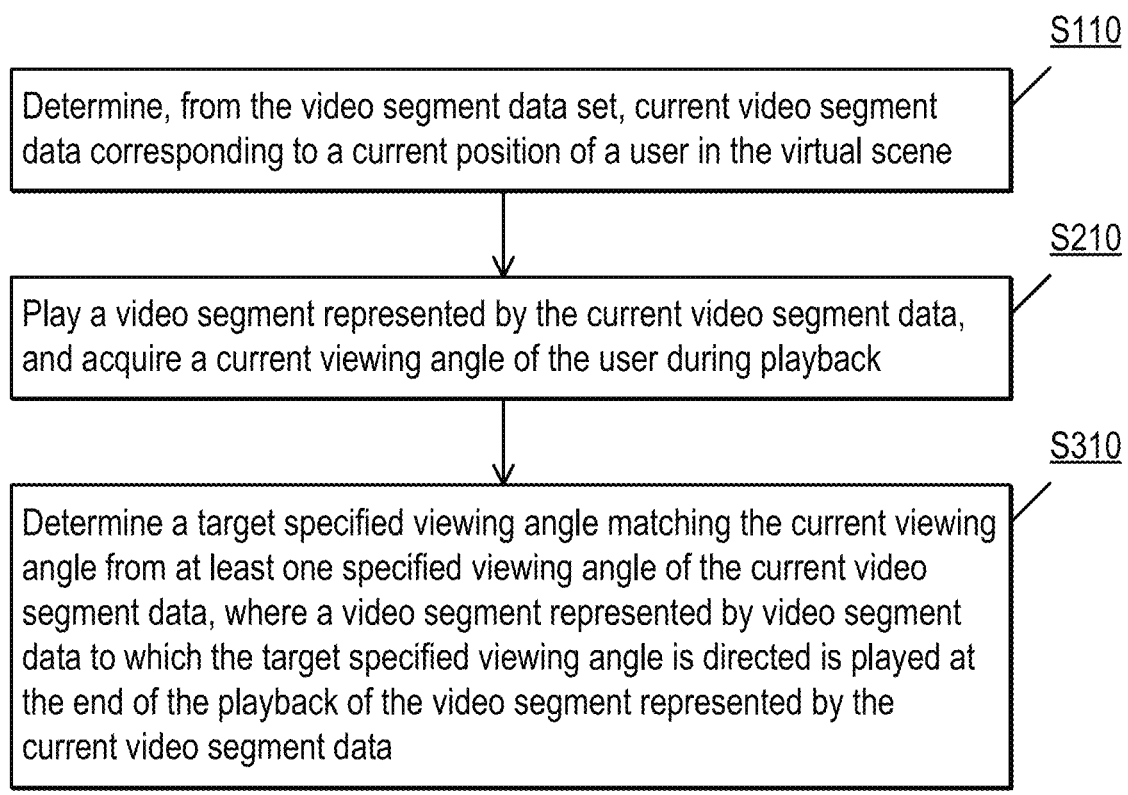
FIG. 8 is a flow diagram of a video playback method executed by a client according to some embodiments of the disclosure.

The embodiments introduced above are all described based on the architecture of a client and a server. During playback of video segments, certain data exchange occurs between the client and the server. In the disclosure, recorded panoramic videos and divided video segment data may further be fully preloaded into the client locally, so that during playback of video segments, the client can completely run offline without the need to interact with the server. Specifically, the disclosure further provides a video playback method in a virtual scene, which can be applied to a client. The client may be provided with a video segment data set. The video segment data set includes at least one piece of video segment data, and the video segment data represents a video segment. Each piece of video segment data includes at least one specified viewing angle and a data identifier representing video segment data to which the specified viewing angle is directed. The video segment data set may be preloaded locally from a server or directly imported locally. Referring to FIG. 8, the method may include the following steps.

S110: determine, from the video segment data set, current video segment data corresponding to a current position of a user in the virtual scene.

S210: play a video segment represented by the current video segment data, and acquire a current viewing angle of the user during playback.

S310: determine a target specified viewing angle matching the current viewing angle from at least one specified viewing angle of the current video segment data, where a video segment represented by video segment data to which the target specified viewing angle is directed is played at the end of the playback of the video segment represented by the current video segment data.

In one embodiment, links representing various scenes may also be displayed on the client. The only difference lies in that when the user triggers a link to a scene, the local video segment data set of the client can be directly searched for video segment data corresponding to the link to the scene. Specifically, the video segment data corresponding to the scene may have a piece of initial video segment data, and a video segment represented by the initial video segment data may be used as first video segment data played by the client to the user. For example, when the user triggers a link to the scene shown in FIG. 2, the client may acquire video segment data at the starting position of path 8 from the video segment data set, where the video segment data at the starting position of path 8 can be the initial video segment data corresponding to the scene. In this way, the client can directly render the acquired initial video segment data and play to the user a video segment obtained by rendering. In this way, the visual experience of the user is that the user is at the starting position of path 8 when video playback starts. In this scenario, the current position of the user in the virtual scene can be an initial position represented by the initial video segment data.

Certainly, in this embodiment, when the user triggers a link to a scene on the client, the client may further show to the user a plan view of the scene, and the plan view may be provided with at least one selectable position. For example, in the scene shown in FIG. 2, the starting positions of path 8 and path 5 are both selectable. The user may select a position in the plan view, and information of the position can be received by the client. In this way, the client can search the local video segment data set for video segment data corresponding to the position information, to render the found video segment data and play to the user a video segment obtained by rendering. The visual experience of the user is that the user is at the previously selected position when playback of the video segment starts. In this scenario, the current position of the user in the virtual scene can be the position selected by the user.

The processes of acquiring a current viewing angle of the user in the subsequent step S210 and determining a target specified viewing angle matching the current viewing angle in S310 are both consistent with the description in the aforementioned embodiment, and will not be described herein again. The difference lies in that after a target specified viewing angle matching the current viewing angle is acquired, video segment data to which the target specified viewing angle is directed may be acquired from the local video segment data set of the client, and the acquired video segment data may be rendered and played after the video segment represented by the current video segment data is played.

In one embodiment, each piece of video segment data in the video segment data set includes a header data field and a body data field, where the at least one specified viewing angle and the data identifier representing the video segment data to which the specified viewing angle is directed are stored in the header data field.

In one embodiment, after the determining a target specified viewing angle matching the current viewing angle from at least one specified viewing angle of the current video segment data, the method further includes: determining, according to a data identifier of the video segment data to which the target specified viewing angle is directed, target video segment data corresponding to the data identifier from the video segment data set, and playing a video segment represented by the target video segment data at the end of the playback of the video segment represented by the current video segment data.

In one embodiment, each specified viewing angle corresponds to a viewing angle range; and accordingly, the determining a target specified viewing angle matching the current viewing angle from at least one specified viewing angle of the current video segment data includes: determining a viewing angle range of the current viewing angle, and using a specified viewing angle corresponding to the determined viewing angle range as the target specified viewing angle.

In one embodiment, if the target specified viewing angle matching the current viewing angle does not exist in the at least one specified viewing angle of the current video segment data, then the method further includes: displaying a frame in the video segment represented by the current video segment data at the end of the playback of the video segment represented by the current video segment data.

In one embodiment, the virtual scene includes at least one path, where each of the paths is associated with a panoramic video taken in a specified direction on the path, and the panoramic video is divided into at least one video segment at a specified time interval.

In one embodiment, the method further includes: generating, according to video segments obtained by dividing the panoramic video, reverse video segments respectively corresponding to the video segments, where a playback order of the reverse video segments is opposite to a playback order of the corresponding video segments.

The specific implementations of the aforementioned embodiments have been described in the embodiment of the video playback method in a virtual scene, and will not be described herein. The difference from the embodiment of the video playback method in a virtual scene lies in that in this embodiment, video segment data is all stored locally on the client; therefore, search and acquisition of video segment data can both be implemented offline, and loading of video segment data locally is usually faster than downloading of video segment data from the server, thereby improving the fluency of video segment playback.

Figure 9:
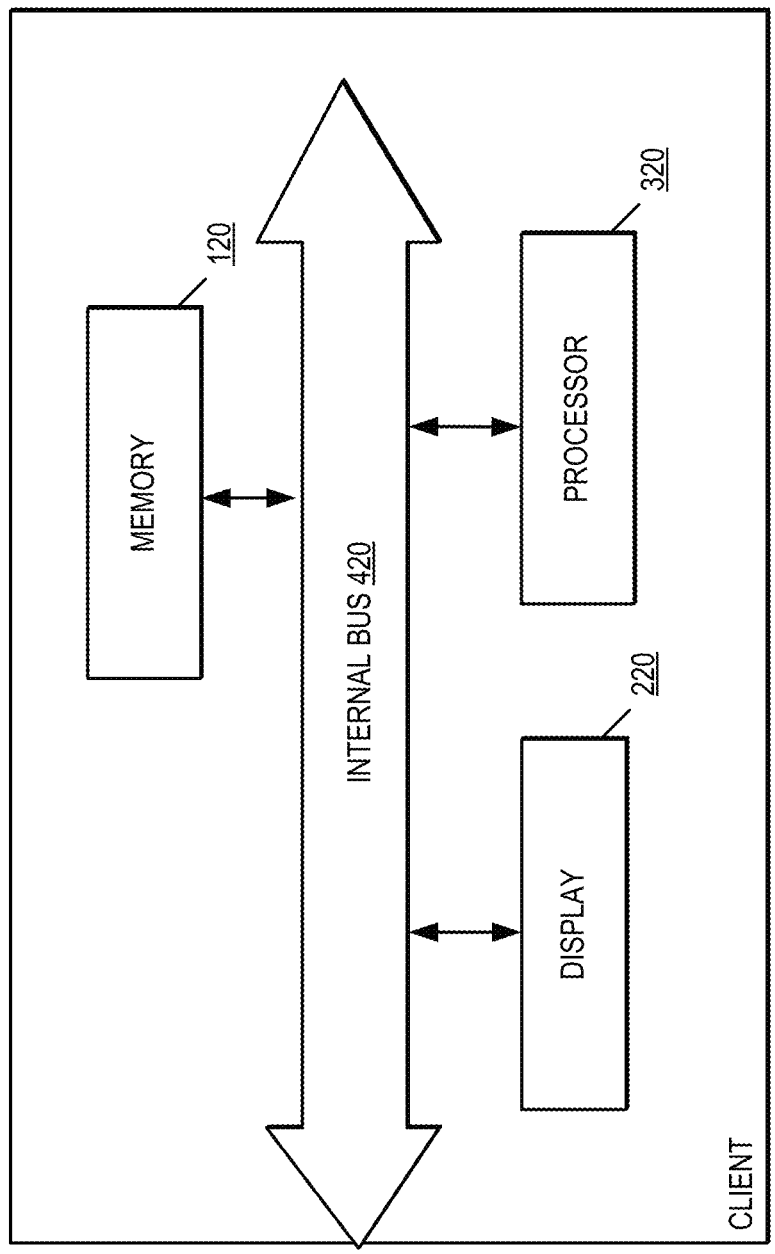
FIG. 9 is a block diagram of a client according to some embodiments of the disclosure.

Referring to FIG. 9, the disclosure further provides a client, including a memory 120, a display 220, a processor 320, and an internal bus 420.

The memory 120 is configured to store a video segment data set. The video segment data set includes at least one piece of video segment data, and the video segment data represents a video segment. Each piece of video segment data includes at least one specified viewing angle and a data identifier representing video segment data to which the specified viewing angle is directed.

The display 220 is configured to display a video segment.

The processor 320 is configured to determine, from the video segment data set of the memory, current video segment data corresponding to a current position of a user in a virtual scene; play, via the display, a video segment represented by the current video segment data, and acquire a current viewing angle of the user during playback; and determine a target specified viewing angle matching the current viewing angle from at least one specified viewing angle of the current video segment data, where a video segment represented by video segment data to which the target specified viewing angle is directed is played at the end of the playback of the video segment represented by the current video segment data.

In one embodiment, the memory 120 may be a memory device for storing information. In a digital system, a device capable of storing binary data may be a memory; in an integrated circuit, a circuit without a physical form and having a storage function may also be a memory such as a RAM or FIFO; in a system, a storage device in a physical form may also be referred to as a memory such as a memory bar or a TF card.

In one embodiment, the display 220 may be a display tool that displays a certain electronic file on a screen via a specific transmission device and then reflects the electronic file to human eyes. The display may include a liquid crystal (LCD) display screen, a cathode ray tube (CRT) display screen, a light-emitting diode (LED) display screen, or the like.

The processor 320 may be implemented in any appropriate manner. For example, the processor may employ the form of a microprocessor or processor and a computer-readable medium that stores computer-readable program code (for example, software or firmware) executable by the (micro)processor, a logic gate, a switch, an application specific integrated circuit (ASIC), a programmable logic controller, and an embedded microcontroller. The disclosure does not make limitation.

The specific functions implemented by the memory 120, the display 220, the processor 320, and the bus 420 of the client disclosed in the aforementioned embodiment may be explained with reference to the embodiment of the video playback method in a virtual scene on the client side in the disclosure, can implement the embodiment of the video playback method in a virtual scene in the disclosure, and achieve the technical effects of the method embodiment.

In view of the above, the disclosure can continuously play video segments to a user, to enable the user to browse objects in a virtual scene. Specifically, when a current video segment is played to the user, a current viewing angle of the user can be determined and a next video segment to be played can be determined according to the current viewing angle of the user. In this way, when playback of the current video segment is completed, the next video segment can be played. The video content presented in front of the user may also change as the viewing angle of the user changes. In this way, the user can perform operations such as going forward or backward or halting via the viewing angle, so that the use of external devices can be avoided to achieve a truly immersive experience.

In the 1990s, whether a technical improvement is a hardware improvement (for example, an improvement on a circuit structure such as a diode, a transistor, or a switch) or a software improvement (an improvement on a method procedure) can be differentiated clearly. However, along with the development of technologies, many improvements on method procedures nowadays can be regarded as direct improvements on hardware circuit structures. Almost all the designers program an improved method procedure into a hardware circuit to obtain a corresponding hardware circuit structure. Therefore, it cannot be said that an improvement on a method procedure cannot be implemented by a hardware entity module. For example, a programmable logic device (PLD) (for example, a field programmable gate array (FPGA)) is such an integrated circuit whose logic function is determined by device programming of a user. The designers may program by themselves to "integrate" a digital system with a PLD, and there is no need to ask a chip manufacturer to design and manufacture an application specific integrated circuit chip. Furthermore, instead of manually manufacturing an integrated circuit chip, such programming is often implemented by "logic compiler" software, which is similar to a software compiler used in program development and writing, and before compiling, original code may also be written in a particular programming language, which is referred to as a hardware description language (HDL). There is not only one type of HDL but also a plurality of types of HDLs, for example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog2 are most commonly used nowadays. A person of ordinary skill in the art should also understand that a hardware circuit for implementing a logic method procedure can be easily obtained once the method procedure is logically programmed by using the aforementioned hardware description languages and is programmed into an integrated circuit.

A person of ordinary skill in the art also know that, in addition to implementing the client and the server by pure computer-readable program code, logic programming can be performed on method steps to allow the client and the server to implement the same function in the form of a logic gate, a switch, an application specific integrated circuit, a programmable logic controller, an embedded microcontroller, or the like. Therefore, such a client or server may be regarded as a hardware component, and an apparatus for implementing various functions included in the client or server may be regarded as a structure in the hardware component. Alternatively, the apparatus for implementing various functions can even be regarded as both a software module for implementing a method and a structure in a hardware component.

Through the above description of the embodiments, a person skilled in the art can clearly understand that the disclosure can be implemented as software plus a necessary universal hardware platform. Based on such understanding, the essence of the technical solution of the disclosure or the part that contributes to the prior art may be embodied in the form of a software product. The computer software product may be stored in a storage medium such as a ROM/RAM, a magnetic disk, or an optical disc, and include instructions to instruct a computer device (which may be a personal computer, a server, a network device, or the like) to perform the methods described in the disclosed embodiments or in some parts of the embodiments.

The embodiments in the present specification are described in a progressive manner, and for identical or similar parts between different embodiments, reference may be made to each other so that each of the embodiments focuses on differences from other embodiments. In particular, the embodiments of the server and the client can both be explained with reference to the aforementioned embodiments of the methods.

The disclosure may be described in a general context of computer-executable instructions executed by a computer, such as a program module. Generally, the program module includes routines, programs, objects, components, data structures, and so on, for executing particular tasks or implementing particular abstract data types. The disclosure may also be implemented in distributed computing environments. In the distributed computing environments, tasks are executed by remote processing devices that are connected by a communication network. In a distributed computing environment, the program module may be located in local and remote computer storage media including storage devices.

Although the disclosure is described via the embodiments, a person of ordinary skill in the art know that the disclosure has many modifications and variations without departing from the spirit of the disclosure. It is intended that the appended claims include these modifications and variations without departing from the spirit of the disclosure.

What is claimed is:

1. A method comprising:
    receiving, by a client device, current video segment data from a server, the current video segment data representing a video segment and comprising a header data field storing a plurality of viewing angles and a data identifier representing video segment data to which the plurality of viewing angles are directed;
    playing, on a display of the client device, the video segment;
    acquiring, by the client device, a current viewing angle of a user operating the client device while playing the video segment;
    determining, by the client device, a target viewing angle matching the current viewing angle from the plurality of viewing angles; and
    playing, on the display, a second video segment represented by video segment data associated with the target viewing angle after playing the video segment represented by the current video segment data.

2. The method of claim 1 further comprising:
    sending, by the client device to the server, a data identifier of the video segment data to which the target viewing angle is directed after determining the target viewing angle; and
    acquiring, at the client device from the server, the video segment data to which the target viewing angle is directed.

3. The method of claim 1 further comprising:
    acquiring, by the client device from the server, video segment data to which data identifiers of pieces of video segment data comprised in the current video segment data are directed;
    determining, by the client device, target video segment data to which the target viewing angle is directed from the pieces of video segment data; and
    playing, by the client device, a video segment represented by the target video segment data at an end of playback of the video segment represented by the current video segment data.

4. The method of claim 1, the video segment data including direction information and after the receiving current video segment data sent from a server, the method further comprises:
    determining, by the client device, a data identifier of video segment data having direction information consistent with that of the current video segment data from various data identifiers comprised in the current video segment data; and acquiring, by the client device from the server, the video segment data to which the determined data identifier is directed.

5. The method of claim 1, wherein each viewing angle in the plurality of viewing angles corresponds to a viewing angle range and the determining the target viewing angle comprises:
   determining, by the client device, a viewing angle range of the current viewing angle; and
   using, by the client device, a viewing angle in the plurality of viewing angles corresponding to the determined viewing angle range as the target viewing angle.

6. The method of claim 1 further comprising: displaying a frame in the video segment represented by the current video segment data at an end of playback of the video segment represented by the current video segment data if the target viewing angle does not exist in the plurality of viewing angles.

7. The method of claim 1, the video segments representing a virtual scene comprising at least one path, each of the paths associated with a panoramic video taken in a specified direction on the path, the panoramic video divided into at least one video segment at a specified time interval.

8. The method of claim 7 further comprising generating, by the client device, according to video segments obtained by dividing the panoramic video, reverse video segments respectively corresponding to the video segments, a playback order of the reverse video segments opposite to a playback order of the corresponding video segments.

9. A non-transitory computer readable storage medium for tangibly storing computer program instructions capable of being executed by a computer processor, the computer program instructions defining steps of:
   receiving current video segment data from a server the current video segment data representing a video segment and comprising a header data field storing a plurality of viewing angles and a data identifier representing video segment data to which the plurality of viewing angles are directed;
   playing, on a display, the video segment;
   acquiring a current viewing angle of a user while playing the video segment;
   determining a target viewing angle matching the current viewing angle from the plurality of viewing angles; and
   playing, on the display, a second video segment represented by video segment data associated with the target viewing angle after playing the video segment represented by the current video segment data.

10. The non-transitory computer readable storage medium of claim 9, the computer program instructions further defining the steps of:
    sending, to the server, a data identifier of the video segment data to which the target viewing angle is directed after determining the target viewing angle; and
    acquiring, from the server, the video segment data to which the target viewing angle is directed.

11. The non-transitory computer readable storage medium of claim 9, the computer program instructions further defining the steps of:
    acquiring, from the server, video segment data to which data identifiers of pieces of video segment data comprised in the current video segment data are directed;
    determining target video segment data to which the target viewing angle is directed from the pieces of video segment data; and
    playing a video segment represented by the target video segment data at an end of playback of the video segment represented by the current video segment data.

12. The non-transitory computer readable storage medium of claim 9, the video segment data including direction information and after the receiving current video segment data sent from a server, the computer program instructions further defining the steps of:
    determining a data identifier of video segment data having direction information consistent with that of the current video segment data from various data identifiers comprised in the current video segment data; and
    acquiring, from the server, the video segment data to which the determined data identifier is directed.

13. The non-transitory computer readable storage medium of claim 9, wherein each viewing angle in the plurality of viewing angles corresponds to a viewing angle range and the determining the target viewing angle comprises:
    determining a viewing angle range of the current viewing angle; and
    using a viewing angle in the plurality of viewing angles corresponding to the determined viewing angle range as the target viewing angle.

14. The non-transitory computer readable storage medium of claim 9 the computer program instructions further defining the step of: displaying a frame in the video segment represented by the current video segment data at an end of playback of the video segment represented by the current video segment data if the target viewing angle does not exist in the plurality of viewing angles.

15. The non-transitory computer readable storage medium of claim 9, the video segments representing a virtual scene comprising at least one path, each of the paths associated with a panoramic video taken in a specified direction on the path, the panoramic video divided into at least one video segment at a specified time interval.

16. The non-transitory computer readable storage medium of claim 15 the computer program instructions further defining the step of generating according to video segments obtained by dividing the panoramic video, reverse video segments respectively corresponding to the video segments, a playback order of the reverse video segments opposite to a playback order of the corresponding video segments.

17. An apparatus comprising:
    a processor configured to:
    receive current video segment data from a server, the current video segment data representing a video segment and comprising a header data field storing a plurality of viewing angles and a data identifier representing video segment data to which the plurality of viewing angles are directed;
    play the video segment;
    acquire a current viewing angle of a user while playing the video segment;
    determine a target viewing angle matching the current viewing angle from the plurality of viewing angles; and
    play a second video segment represented by video segment data associated with the target viewing angle after playing the video segment represented by the current video segment data.

18. The apparatus of claim 17, the video segments representing a virtual scene comprising at least one path, each of the paths associated with a panoramic video taken in a specified direction on the path, the panoramic video divided into at least one video segment at a specified time interval.

\* \* \* \* \*